US008566320B2

(12) United States Patent  
Ghosh

(10) Patent No.: US 8,566,320 B2
(45) Date of Patent: Oct. 22, 2013

(54) SYSTEM AND METHOD FOR SELECTIVELY PROVIDING AN AGGREGATED TREND

(75) Inventor: Partha Pratim Ghosh, Hyderabad (IN)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/300,962

(22) Filed: Nov. 21, 2011

(65) Prior Publication Data

US 2013/0132390 A1    May 23, 2013

(51) Int. Cl.
*G06F 17/30* (2006.01)
(52) U.S. Cl.
USPC ........... 707/737; 707/749; 707/751; 707/802; 705/4; 705/14.45
(58) Field of Classification Search
USPC .......................................................... 707/737
See application file for complete search history.

(56) References Cited

U.S. PATENT DOCUMENTS

| | | | | |
|---|---|---|---|---|
| 6,489,968 | B1* | 12/2002 | Ortega et al. ................ | 715/713 |
| 7,146,416 | B1* | 12/2006 | Yoo et al. .................... | 709/224 |
| 7,421,659 | B2* | 9/2008 | Estrada et al. ............... | 715/751 |
| 7,583,266 | B2* | 9/2009 | Ben-Tovim et al. ......... | 345/440 |
| 7,610,249 | B2* | 10/2009 | Afeyan et al. ............... | 706/13 |
| 7,792,841 | B2* | 9/2010 | McAllister et al. .......... | 707/749 |
| 7,831,695 | B1* | 11/2010 | Burr et al. .................... | 709/220 |
| 2007/0112607 | A1* | 5/2007 | Tien et al. .................... | 705/7 |
| 2007/0255668 | A1* | 11/2007 | Kadambe et al. ............ | 706/20 |
| 2008/0077568 | A1* | 3/2008 | Ott ............................... | 707/5 |
| 2008/0301018 | A1* | 12/2008 | Fine et al. .................... | 705/35 |
| 2009/0204478 | A1* | 8/2009 | Kaib et al. ................... | 705/10 |
| 2009/0271368 | A1* | 10/2009 | Channell ...................... | 707/3 |
| 2009/0292620 | A1* | 11/2009 | Seki et al. .................... | 705/26 |
| 2010/0088322 | A1* | 4/2010 | Chowdhury et al. ........ | 707/751 |
| 2010/0100537 | A1* | 4/2010 | Druzgalski et al. .......... | 707/713 |
| 2010/0293034 | A1* | 11/2010 | Olejniczak et al. .......... | 705/10 |
| 2011/0078143 | A1 | 3/2011 | Aggarwal | |
| 2011/0106567 | A1* | 5/2011 | Asher ........................... | 705/4 |
| 2011/0106578 | A1* | 5/2011 | Cerminaro ................... | 705/7.28 |
| 2011/0119148 | A1* | 5/2011 | Yoshii .......................... | 705/26.7 |
| 2011/0231522 | A1* | 9/2011 | Knight et al. ................ | 709/219 |
| 2011/0238593 | A1* | 9/2011 | Hearnes, II et al. ......... | 705/341 |
| 2011/0252044 | A1* | 10/2011 | Shin ............................. | 707/749 |
| 2011/0307515 | A1* | 12/2011 | Chen et al. ................... | 707/770 |

OTHER PUBLICATIONS

V. Ciriana, S. De Capitani di Vimercati, S. Foresti, and P. Samarati, "K-Anonymous Data Mining: A Survey," *In Privacy-preserving Data Mining: Models and Algorithms, Advances in Database Systems*, 2008, pp. 105-136, vol. 34.

L. Xiong, S. Chitti and L. Liu, "Preserving Data Privacy for Outsourcing Data Aggregation Services," *ACM Transactions on Internet Technology (TOIT)—Special Issue on the Internet and Outsourcing*, Aug. 2007, pp. 1-27, vol. 7 No. 3.

(Continued)

*Primary Examiner* — Binh V Ho
(74) *Attorney, Agent, or Firm* — L. Alan Collins; Collins & Collins Intellectual, LLC

(57) ABSTRACT

A method of selectively providing an aggregated trend obtained from at least a subset of a plurality of individual trends. The method comprises deciding whether to provide the aggregated trend by determining whether an individual trend in at least the subset of the plurality of individual trends can be at least partially identified from the aggregated trend.

17 Claims, 5 Drawing Sheets

(56) References Cited

OTHER PUBLICATIONS

J. Fielding, "Linkability in Activity Inference Data Sets," *Senior Honors Thesis, Dartmouth Computer Science Technical Report TR2008-623*, Jun. 5, 2008, pp. 1-11.

T. Trojer, B. C. M. Fung and P. C. K. Hung, "Service-Oriented Architecture for Privacy-Preserving Data Mashup," *IEEE International Conference on Web Services*, Jul. 10, 2009, pp. 767-774.

E. Aïmeur, G. Brassard, J. M. Fernandez and F. S. M. Onana, "ALAMBIC: A Privacy-Preserving Recommender System for Electronic Commerce," *International Journal of Information Security*, Sep. 2008, pp. 307-334, vol. 7, No. 5.

F. Kerschbaum, "Building a Privacy-Preserving Benchmarking Enterprise System," *IEEE International Enterprise Distributed Object Computing Conference*, Oct. 19, 2007, pp. 87-96.

* cited by examiner

|  | Time Period | Time Period 2 | Time Period 3 | ... | Time Period N |
|---|---|---|---|---|---|
| S. Maker 1 | 100 | 30 | 20 |  | 10 |
| S. Maker 2 | 10 | 30 | 25 |  | 90 |
| S. Maker 3 | 0 | 0 | 2 |  | 4 |
| ... |  |  |  |  |  |
| S. Maker M | 20 | 5 | 20 |  | 85 |

FIG. 2

SYSTEM AND METHOD FOR SELECTIVELY PROVIDING AN AGGREGATED TREND

BACKGROUND

A software application can be developed by a software maker for subsequent use on one or more computing devices. There are numerous approaches by which the software maker may make the software application available for installation and/or use on one or more computing devices. One such approach involves distributing the software application by enabling the software application to be downloaded to one or more computing devices from a system having access to the software application.

One example of such a system is an online software distribution system that allows users to download one or multiple software applications that the online software distribution system has access to. The maker of a software application may provide the online software distribution system with access to the software application (e.g., by uploading the software application to the online software distribution system). In turn, a user or administrator of a computing device may download a software application to the computing device by using the online software distribution system. As such, online distribution systems allow software makers (e.g., software developers, businesses involved with software development, etc.) to make numerous software applications available for installation and/or use on multiple computing devices. Some online distribution systems for distributing software applications are known as "Application stores" or "App. stores," for short.

A conventional online software distribution system may collect numerous types of information associated with its operation. For example, an online software distribution system may collect information associated with one or more software applications being distributed by the system. Such information may include historical and current information about transactions corresponding to software applications. For example, the online software distribution system may collect information about how many times an application has been purchased and/or downloaded in a particular time period.

SUMMARY

A system, such as an online software distribution system, may selectively provide a software maker with information about a software application developed and/or distributed by the software maker. The provided information may comprise business information including trends in transactions associated with the software application, such as trends in the number of downloads and/or purchases of the software application. The provided information may also comprise aggregated trends in transactions obtained from transactions associated with other software applications (e.g., software applications in a similar category, competing software applications, etc.) developed and/or distributed by other software makers. These trends may provide the software maker with valuable business information because they enable the software maker to evaluate the performance of his software application relative to that of related software applications.

To avoid the risk of providing business information about one software maker to another software maker, the online software distribution system may selectively provide a software maker with business information such that the privacy of business information about other software makers is not compromised. The system may provide a software maker with an aggregated trend in transactions associated to software applications developed and/or distributed by other software makers, when the software maker may not identify a trend in transactions associated with any specific software maker by using the aggregated trend.

The selective provision of trend data may also be applied in other contexts. Accordingly, in some embodiments, a method is provided for selectively providing an aggregated trend obtained from at least a subset of a plurality of individual trends. The method comprises deciding whether to provide the aggregated trend by determining whether an individual trend in at least the subset of the plurality of individual trends can be at least partially identified from the aggregated trend.

In another aspect, a system for selectively providing an aggregated trend obtained at least in part by aggregating at least a subset of a plurality of individual trends is provided. The system comprises at least one processor configured to: compute a measure of disorder in at least the subset of the plurality of individual trends; and decide whether to provide the aggregated trend based on the computed measure of disorder.

In yet another aspect, at least one computer-readable storage medium is provided. The least one computer-readable storage medium stores processor-executable instructions that, when executed by at least one processor, perform a method for selectively providing an aggregated trend to a first software maker, wherein the aggregated trend is related to at least a subset of a plurality of individual trends associated with a plurality software makers comprising the first software maker and a second software maker. The method comprises computing a measure of disorder in at least the subset of the plurality of individual trends; providing the aggregated trend to the first software maker when the computed measure of disorder is greater than a predetermined threshold; and deciding whether to provide the aggregated trend based at least in part on a measure of similarity between two trends, when the computed measure of disorder is below the predetermined threshold.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2 illustrates an example of information associated with one or more trends, in accordance with some embodiments of the present disclosure.

DETAILED DESCRIPTION

Figure 1:
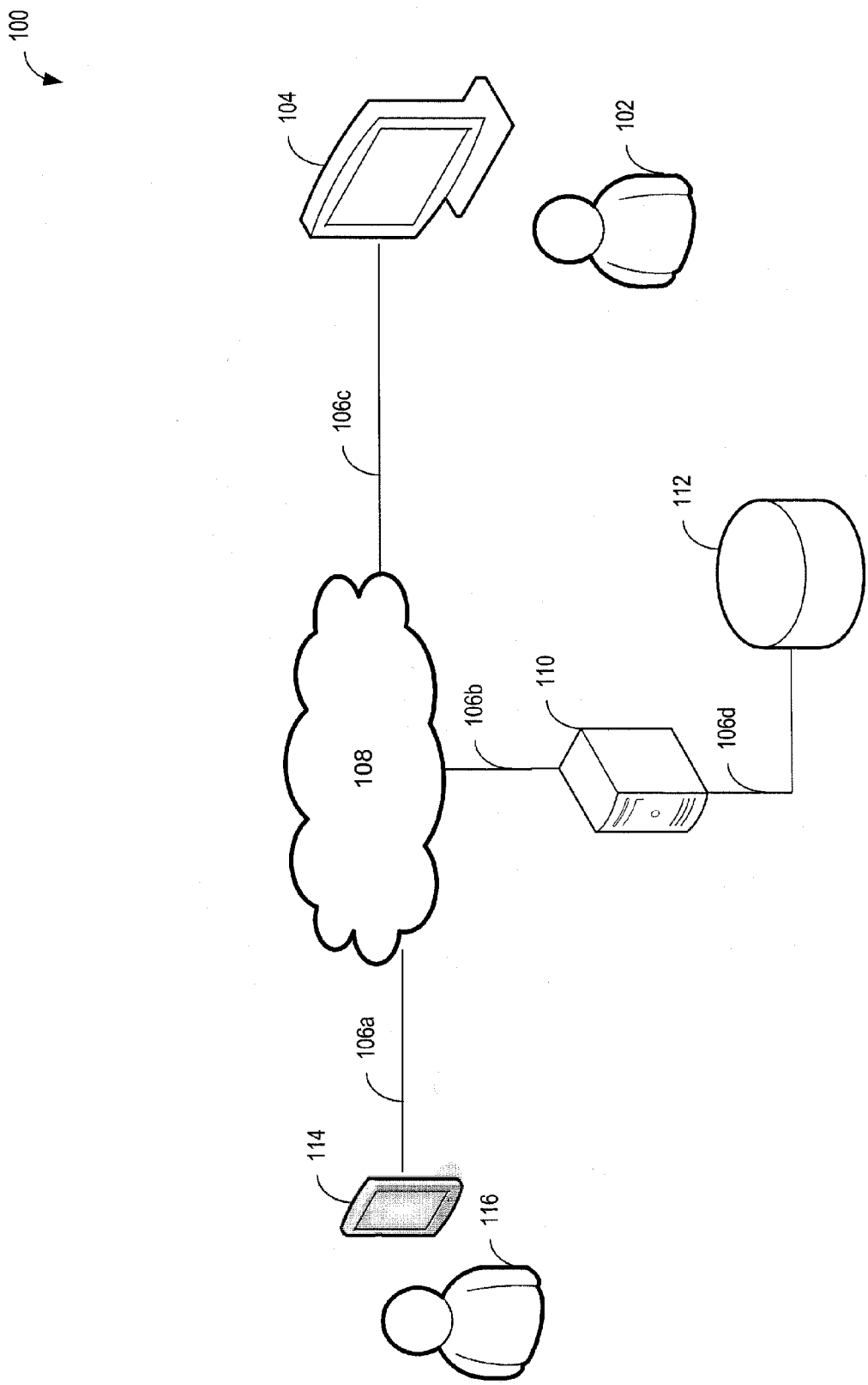
FIG. 1 shows an exemplary computing environment for selectively providing an aggregated trend, in accordance with some embodiments of the present disclosure.

The inventors have recognized and appreciated that it may be desirable to reveal information collected by an online distribution system, such as information about transactions associated with one or more software applications distributed by the online software distribution system. In some cases, it may be desirable to reveal trends in transactions associated with one or more software applications developed and/or distributed by one or more software makers. For example, a software maker may wish to obtain information about how many times a particular software application, developed by the software maker, has been purchased in a particular time period. However, purchasing patterns—even about a software maker's own products—may be more useful if they are placed in context of an overall market. As a result, a software maker also may wish to obtain information about how many times a software application has been purchased relative to how many times similar software applications developed and/or distributed by other software makers have been purchased.

Accordingly, the inventors have recognized and appreciated that it may be desirable to reveal one or more individual trends in the transactions associated with a software application developed and/or distributed by a software maker. The information provided to each software maker may relate to that software maker's products. The inventors have also recognized that it may be desirable to reveal one or more aggregated trends obtained from transactions and/or trends in the transactions associated with multiple software applications developed and/or distributed by one or more other software makers.

The inventors have recognized and appreciated that it may be desirable to reveal one or more aggregated trends to one or more software makers because such information may provide the software maker(s) with useful business information. For example, a software maker may use an aggregated trend to compare a trend in transactions obtained from transactions associated with a software application (e.g., a game) developed by the software maker to an aggregated trend in transactions obtained from transactions associated with multiple similar software applications (e.g., other games) developed by other software makers. Such a comparison may allow a software maker to evaluate the performance of the software application. For example, if the trend indicates that the number of purchases of a software application has declined over a period of time (i.e., a downward trend), it may be valuable for the maker of the software application to know whether the number of purchases of similar software applications in the same time period has declined as well. Generally, comparing any trend in transactions associated with a software application made by a software maker with an aggregated trend in transactions associated with other software applications may provide the software maker with valuable business information.

The inventors have also recognized and appreciated that providing one or more aggregated trends may result in information about a software maker being revealed. In particular, the inventors have recognized that providing one software maker with an aggregated trend may allow the software maker to use the aggregated trend to identify individual trends in transactions associated with (one or more software applications developed and/or distributed by) another software maker (e.g., a software maker associated with a large portion of transactions related to a set of applications, or any other software maker), thereby potentially revealing information about one software maker to another software maker. For example, a recipient of aggregated trend information may use additional information about trends for which it has knowledge, to extract from the aggregated trend information about another party.

Providing information to one party that reveals information about another party may be undesirable, especially when the software makers are competitors. As one non-limiting example, consider a scenario where two software makers develop competing software applications and distribute them using an online software distribution system that keeps track of transactions associated with both software applications. If information about a trend aggregated across transactions associated with both software applications (e.g., number of purchases as a function of time, number of purchases as a function of the purchasing user's age, etc.), is provided to one of the software makers, that software maker can easily infer the nature of the transactions associated with the competitor's software application. For instance, the software maker can subtract the number of purchases (e.g., made in a certain period of time, made by users in certain age group, etc.) associated with the software maker's software application from the number of purchases specified in the aggregated trend to obtain the number of purchases associated with the competitor's software application. Though, it should be recognized, that there are numerous other scenarios where a software maker may identify information about one or more other software makers by using an aggregated trend provided by an online software distribution system.

Accordingly, the inventors have recognized and appreciated a need for a method of selectively providing an aggregated trend only in scenarios where information about a software maker may not be revealed. The inventors have further appreciated that an improved online software distribution system may be obtained by employing such a method. Indeed, by selectively providing an aggregated trend to one or more software makers, such an online software distribution system may provide software makers with useful business information without compromising the privacy of their own business information. Software makers are more likely to want to use such an online software distribution system for distributing software applications.

Accordingly, in some embodiments, a decision of whether to provide an aggregated trend to a software maker may be made by analyzing the transactions and/or individual trends in transactions from which the aggregated trend was obtained. The analysis may comprise determining whether an individual trend in transactions, associated with a software application developed and/or distributed by another software maker, can be at least partially identified by using the aggregated trend. A decision to provide an aggregated trend may be made if it is determined that an individual trend in transactions may not be identified by using the aggregated trend. On the other hand, a decision not to provide an aggregated trend may be made if it is determined that an individual trend in transactions (e.g., a trend associated with a software maker associated with a substantial portion of transactions related to a set of applications) may be identified by using the aggregated trend.

In some embodiments, a two-stage procedure for deciding whether to provide an aggregated trend may be employed. The first stage may comprise analyzing a set of transactions and/or a set of individual trends in transactions from which the aggregated trend was obtained and determining whether to provide the aggregated trend based at least in part on the results of the analysis. However, if it is determined, in the first stage, that the aggregated trend may not be provided, a second stage may be performed in which further analysis of the set of transactions and/or the set of individual trends in transactions may be undertaken to determine whether the aggregated trend may be provided.

For instance, in some embodiments, the first stage may comprise computing a measure of disorder (e.g., entropy) in a set of individual trends in transactions from which the aggregated trend was obtained. The aggregated trend may be provided when the computed measure of disorder is greater than a predetermined threshold. On the other hand, if the computed measure of disorder is below the predetermined threshold, the second stage may comprise performing further analysis on the set of individual trends by computing a measure of similarity among pairs of trends and determining whether to provide the aggregated trend based at least in part on the computed measure of similarity.

It should be appreciated that the various aspects and concepts of the present invention described herein may be implemented in any of numerous ways, and are not limited to any particular implementation technique. Examples of specific implementations are described below for illustrative purposes only, but the aspects of the invention described herein are not limited to these illustrative implementations.

FIG. 1 shows a non-limiting illustrative environment 100 in which embodiments of the present invention may operate. For purposes of illustration, the invention is described in connection with a software distribution system. However, it should be appreciated that a software distribution system is an example of a system in which trends related to multiple entities may be useful when aggregated, but that entities associated with the individual trends may not want aggregated information to reveal their individual trends.

In the illustrative environment, user 116 may be a party to a transaction associated with a software application distributed by online software distribution system 110. The software application may have been developed by software maker 102 and may be distributed by online software distribution system on behalf of and, optionally, in conjunction with software maker 102.

User 116 may be a party to any suitable transaction associated with the software application. For example, the transaction may comprise viewing information associated with the software application, downloading the software application, downloading other software related to the software application, downloading an update to the software application, purchasing the software application, etc. Though it should be recognized that the above examples are only illustrative and that user 116 may be a party to any other suitable transaction associated with the software application or other type of product, or may be participating in some transaction about which information is captured as a trend.

User 116 may perform any of numerous actions corresponding to one or more transactions. User 116 may operate a computing device, such as mobile computing device 114, to perform one or more actions corresponding to the transaction. For example, user 116 may operate the computing device to download the software application, purchase the software application, and/or perform any other suitable action(s) corresponding to any of the above-described transactions associated with the software application. Though, it should be recognized that user 116 may use any computing device to perform one or more actions corresponding to a transaction as the type of computing device that user 116 employs, as aspects of the present invention are not limited in this respect.

Online software distribution system 110 may be any suitable online software distribution system. For example, online software distribution system 110 may be an online software application store that allows users to perform any of the above-described transactions associated with one or more software applications that the application store may have access to. As one example, the application store may allow one or more users to purchase one or more software applications. As another specific example, the application store may allow one or more users to download one or more software applications.

Online software distribution system 110 may be configured to distribute any suitable number of software applications. For example, the online software distribution system 110 may be configured to distribute at least 100, at least 1000, at least 5,000, at least 10,000 software applications, etc. The software applications may be software applications of any suitable type used for any suitable purpose. The software applications may be stand-alone applications (e.g., a game, a word processing utility, a browser, a music browsing/listening application, etc.) or be software applications to be used in conjunction with other software applications (e.g., an update to a software application). Though, it should be recognized that these examples are only illustrative and any other software application, having any suitable functionality, may be distributed by the online software distribution system.

Online software distribution system 110 may obtain access to one or more software applications in any of numerous ways. In some embodiments, online software distribution system 110 may obtain access to one or more software applications from one or more software makers. For example, a software maker (e.g., software maker 102) may provide online software distribution system 110 with access to one or more software applications. In the illustrated embodiment, software maker 102 may upload one or more software applications to online software distribution system 110 using computing device 104. Though, it should be recognized, that software maker 102 may provide online software distribution system 110 with access to one or more software applications in any other suitable way, using any other suitable computing device(s), as aspects of the present invention are not limited in this respect.

Software maker 102 may be any of numerous entities associated with the development and/or distribution of one or more software applications. For example, a software maker may be a single software developer or multiple software developers who develop the one or more software applications. As another example, a software maker may be a business or multiple businesses that play at least a partial role in the development and/or distribution of one or more software applications. More generally, a software maker may be any entity that may provide an online software distribution system with access to the one or more software applications. It should be recognized that the above examples of software makers are only illustrative, as aspects of the present invention are not limited in this respect.

Users and software makers alike may communicate with the online software distribution system in any suitable way. For example, in the illustrated embodiment, mobile computing device 114, used by user 116, is configured to communicate with online software distribution system 110 via network 108. Similarly, computing device 104, used by software maker 102, is configured to communicate with online software distribution system 110 via network 108. Network 108 may be any suitable network and, for example, may comprise the Internet, a LAN, a WAN, and/or any other wired or wireless network, or combination thereof.

It should also be recognized that although in the illustrated embodiment computing devices 114 and 104 are shown to communicate with network 108 using wireless connection 106a and wired connection 106c, respectively, computing devices 114 and 104 may communicate with network 108 using any suitable type of connection. Similarly, wired connection 106c, between online software distribution system 110 and network 108, and wired connection 106d, between online software distribution system 110 and database 112, may each be any suitable type of connection as aspects of the present invention are not limited in this respect.

Online software distribution system 110 may collect any suitable information associated with one or more software applications distributed by the system. The collected information may include any information associated with any transactions associated with a software application distributed by the system. For example, the collected information may include data indicating how many times a particular transaction (e.g., viewing information about the software application, purchasing the software application, downloading the software application, etc.) occurred. As another example, the collected information may include data about when a particular transaction occurred.

As yet another example, the collected information may include information associated with any user that was a party to any transaction associated with a software application distributed by the system. Information associated with a user may comprise any information that may be of interest to the software maker. Such information may include the user's age, interests, history of transactions with the online software distribution system, information about the computing device or devices used by the user, etc. Of course, the system may limit the collection of personally identifiable information to only scenarios in which the user has consented to such information being collected. Though, it should be recognized that the above-mentioned examples of information that an online software distribution system are only illustrative and any other suitable information associated with a transactions may be collected by the online software distribution system.

Regardless of the nature of information collected, online software distribution system 110 may perform any of numerous actions with the information that the system collects. For example, any information collected by online software distribution system 110 may be stored for subsequent use. In the illustrated embodiment, for instance, online software distribution system 110 may store any collected information in database 112. Database 112 may be any suitable storage means for storing data, including information collected by the online software distribution system, as aspects of the present invention are not limited in this respect.

As another example, online software distribution system 110 may selectively provide the collected information and/or any information derived from the collected information to one or more software makers. The online software distribution system may provide such information to a software maker if it is determined that providing such information to the software maker will not also reveal information about another software maker. The information may be provided in any suitable way as the way in which an online software distribution system provides information to a software maker is not a limitation of aspects of the present invention.

As yet another example, online software distribution system 110 may analyze the collected information. The online software distribution system may analyze the collected information in any suitable way and for any suitable purpose. For example, as described in greater detail below, the collected information may be analyzed to determine whether the collected information and/or any information derived from the collected information may be provided to one or more software makers. To this end, in some embodiments, the online software distribution system may analyze collected information to identify one or more individual trends in transactions, each individual trend associated with a software application. Additionally, the online software distribution system may analyze collected information to identify one or more aggregated trends in transactions, each aggregated trend associated with multiple software applications.

An illustrative example of information collected by an online software distribution system, such as online software distribution system 110, is shown in FIG. 2. FIG. 2 shows an illustrative data structure 200 that may store information collected by an online software distribution system. Though, data structure 200 is shown as organizing information in a matrix, this is merely an example, as the way in which information collected by an online software distribution system is be stored and the format in which it is store is not a limitation of aspects of the present invention.

In the illustrated embodiment, data structure 200 stores information about transactions associated with one or more software makers in one or more time periods. However, in other embodiments data structure 200 may store information about such transactions organized in any suitable way other than with respect to time. For example, data structure 200 may be adapted to store information about transactions associated with one or more software makers in one or more groups with each group corresponding to a group of users (e.g., grouped by age, similar interests, etc.) that were parties to one or more transactions. Many other examples of how to organize transaction information will be apparent to those skilled in the art.

Data structure 200 may store information about transactions associated with any suitable number of software makers. For example, data structure 200 may store information about at least one, at least two, at least five, at least ten, at least 100, at least 1000 software makers, etc. In the illustrated embodiment, the number of software makers is denoted by a positive integer M. Accordingly, the software makers may be indexed by M such as by integers ranging from 0 to M−1.

Similarly, data structure 200 may store information about transactions associated with any suitable number of time periods. For example, data structure 200 may store information about transactions occurring within at least one time period, at least two time periods, at least five time periods, at least ten time periods, at least 100 time periods, at least 1000 time periods, etc. In the illustrated embodiment, the number of time periods is denoted by a positive integer N.

A time period may be any suitable period of time with respect to which information about transactions associated with one or more software applications, developed and/or distributed by one or more software makers, may be organized. For example, a time period may be any time period within which one or more such transactions were conducted. The time period may be of any suitable length such as a day or multiple days, a week or multiple weeks, a month or multiple months, a year or multiple years, etc. Though, the time period may be a time period of any other suitable length.

Data structure 200 may store information about transactions associated with any one of M software makers and any one of N time periods and, for instance, may store a number of transactions, associated with one or more software applications developed and/or distributed by a particular software maker, occurring within a particular time period. For example, data structure 200 shows that 100, 30, 20, and 10 transactions associated with the first software maker occurred within the first, second, third, and N'th time periods, respectively. As another example, data structure 200 shows that 20, 5, 20, and 85 transactions associated with the third software maker occurred in the first, second, third, and N'th time periods, respectively. It should be appreciated that the specific numbers of transactions as shown in FIG. 2 are merely illustrative and are not a limitation on aspects of the present invention.

The number of transactions associated with a particular software maker and a particular time period may refer to a number of any suitable types of transactions and, for example, may refer to any of the types of transactions previously discussed. For example, the number may refer to a number of purchases or downloads of a software application developed and/or distributed by a software maker in a time period. As a specific example, data structure 200 indicates that a software application developed by the second software maker may have been downloaded 90 times in the N'th time period.

Information collected by an online software distribution system (e.g., online software distribution system 110) may be analyzed to identify trends in transactions associated with one or more software makers. The collected information may be analyzed to identify one or more individual trends in transactions associated with a software application developed and/or distributed by a software maker.

In some embodiments, an individual trend may comprise a data sequence obtained from transactions associated with a software application developed and/or distributed by the software maker. The data sequence may be any suitable data sequence obtained from the transactions and organized as a function of any suitable variable. For example, the data sequence may be a time series, each element of which is a number reflecting a number of transactions that occurred within a particular time period. As a specific example, each of the M rows of the data structure 200 shown in FIG. 2 may be an individual trend.

However, it should be recognized, that an individual trend is not limited to being a time series and, for example, may be a sequence of data organized with respect to a variable other than time. For example, the data sequence may be a sequence each element of which is a number reflecting a number transactions made by users in a particular group of users (e.g., grouped by age, by geographic location, common interests, etc.). Indeed, any other suitable variable (e.g., any characteristic that may be used to group users), may be used to organize information associated with transactions into a data sequence.

Additionally or alternatively, information collected by an online software distribution system may be analyzed to identify one or more aggregated trends in transactions, each aggregated trend associated with multiple software makers. An aggregated trend may comprise a data sequence obtained from transactions and/or individual trends in transactions associated with these software applications. Similarly to an individual trend, an aggregated trend may comprise a data sequence that may be any suitable data sequence obtained from the transactions and organized as a function of any suitable variable such time, user age groups, etc.

In some embodiments, an aggregated trend may be obtained from at least a subset of multiple individual trends. This may be done in any suitable way. For example, an aggregated trend may be obtained by performing one or more calculations on the subset of individual trends (e.g., by summing them, averaging them, etc.). As a specific example, consider the individual trends represented by the rows of data structure 200. At least a subset of these individual trends may be used to obtain an aggregated trend, for example, by summing or averaging the number of transactions occurring within each particular time period across the at least a subset software makers. However, it should be appreciated that an aggregated trend may be calculated from data related to multiple entities in any suitable way.

To provide further intuition as to how an aggregated trend may be obtained from a set of individual trends, consider the data structure 200 as an M×N matrix F, with the element in the i'th row and j'th column denoted by $f_{ij}$. Accordingly, $f_{ij}$ represents the number of transactions (e.g., number of downloads, number of purchases, etc.) associated with the i'th software maker that occurred in the j'th time period (e.g., $f_{1,3}=20$). Let the i'th row of F (the individual trend corresponding to the i'th software maker in this example) be denoted by $F_i$. Elements of the rows of F may be used to obtain an aggregated trend $F_M=\{f_{Mj}, \text{ for all } 0 \leq j \leq N-1\}$ indicating a number of transactions made for all software makers in each of the N time periods, such that the j'th element of $F_M$, $f_{Mj}$, may be computed via: $f_{Mj}=\Sigma_{i=0}^{M-1}f_{ij}$. Though, it should be recognized that the aggregated trend $F_M$ may be computed in any other suitable way and, for example, may be computed by using only a subset of the M individual trends in the data structure 200 or by using any other suitable calculation other than summing (e.g., averaging, variance, any of numerous other statistical calculations, etc.).

It should be appreciated that revealing an aggregated trend to a software maker may allow the software maker to use the aggregated trend to at least partially identify an individual trend in transactions. For example, in the illustrated example of FIG. 2, consider an aggregated trend obtained by summing the number of transactions across the first three software makers. Providing such an aggregated trend to the second software maker may reveal valuable business information about the first software maker (e.g., the downward trend in the number of transactions associated with a software application developed and/or distributed by the first software maker). Though, it should be recognized that revealing an aggregated trend to a software maker may allow the software maker to at least partially identify any of other numerous types of business information about another software maker, for example, including business information about transactions occurring during a certain period of time (e.g., number of purchases and/or downloads of a software applications developed and/or distributed by the other software maker during the period of time).

Regardless of the specific nature of the information collected and analysis performed to generate new information, an online software distribution system as illustrated in FIG. 1 may limit the distribution of that information such that information about one party is unlikely to be revealed to another by providing information to another party. Accordingly, though the system may provide data collected about events related to one party to that party, the system may limit the provision of data about events related to multiple parties so as not to reveal data about one party to another party.

Figure 3:
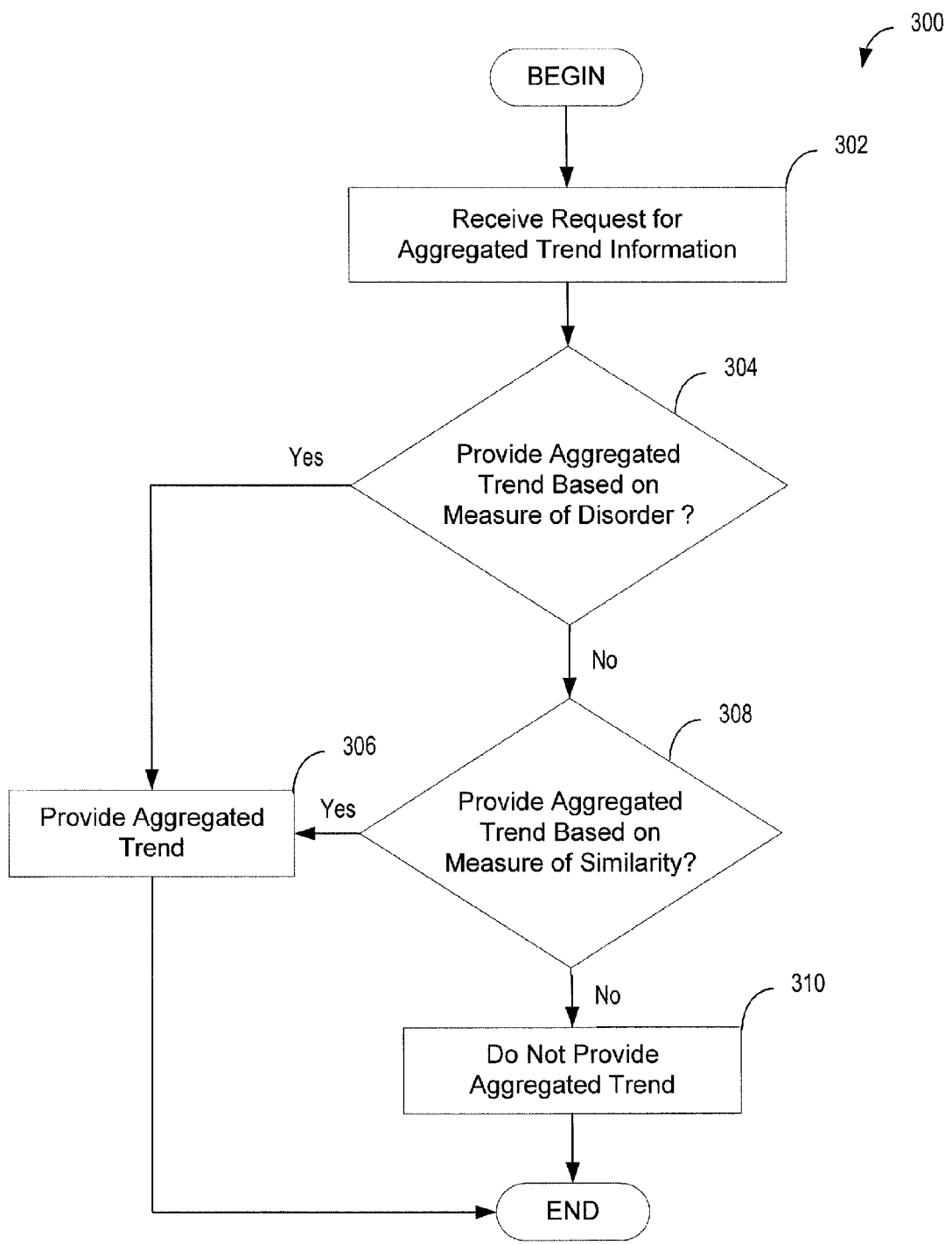
FIG. 3 is a flow chart of an illustrative process for selectively providing an aggregated trend, in accordance with some embodiments of the present disclosure.

Accordingly, in some embodiments, an online software distribution system may use a method for selectively providing one or more aggregated trends to one or more software makers. One such method is illustrated in FIG. 3, which shows an illustrative process 300 for selectively providing one or more aggregated trends. Process 300 may be performed by an online software distribution system such as online software distribution system 110 described with reference to FIG. 1. In the illustrated embodiment, process 300 makes a determination of whether to provide an aggregated trend by using a two-stage procedure as described in greater detail below.

Process 300 begins in act 302, where a request for an aggregated trend is received. The request may be received in any suitable way and, for example, may be received from one or more software makers, or a third party making the request on behalf of one or more software makers. Additionally or alternatively, the request may be generated by the online software management system, which may be configured to selectively provide one or more software makers with one or more aggregated trends. Though, it is not a requirement that the request come from or relate to any of the software vendors.

The request for an aggregated trend may specify any suitable information that may be used to obtain the aggregated trend. For example, the request may specify any information that may be used to identify a set of individual trends from which the aggregated trend may be obtained. To this end, the request may specify one or more parameters that may be used to obtain the aggregated trend. For example, the request may specify one or more types of transactions. As such, the request may specify that an aggregated trend in downloads (purchases, related software downloads, etc.) associated with multiple software applications is being requested. As another example, the request may specify a variable with respect to which the aggregated trend may be defined. As such, the request may specify that an aggregated trend in transactions as a function of time (or any other suitable variable such as a characteristic of users) is being requested.

As yet another example, the request may specify a number of individual trends from which the aggregated trend may be obtained. As such, the request may specify a number of software applications and/or software makers such that the aggregated trend may be obtained from transactions associated with the specified number of software applications and/or software makers (e.g., use transactions associated with the top 5 software makers, use transactions associated with top ten software applications, etc.). Though it should be recognized that the above examples are merely illustrative as a request may specify any other suitable information that may be used to obtain an aggregated trend. The request for an aggregated trend may be in any suitable format, as aspects of the present invention are not limited in this respect.

After a request for an aggregated trend is received in act 302, process 300 proceeds to decision block 304, where a decision of whether to provide the aggregated trend is made by using the individual trends in transactions from which the aggregated trend was obtained. These individual trends may be analyzed and the decision of whether to provide the aggregated trend may be made based on this analysis. It should be appreciated that the individual trends may be identified in any suitable way and, for example, may be identified in the request received in act 302 and/or be identified by the online software distribution system.

The individual trends may be analyzed in any suitable way in act 304. For example, they may be analyzed to determine whether an aggregated trend obtained from the individual trends may be used to at least partially identify one of the individual trends. In one embodiment, the individual trends may be analyzed by using statistical techniques to determine whether an aggregated trend obtained from the individual trends may be used to at least partially identify one of the individual trends. As a specific example, statistical techniques may be used to compute a measure of disorder in the set of individual trends because the computed measure of disorder may be indicative of whether it is possible to at least partially identify one of the individual trends by using the aggregated trend. This is discussed in greater detail below with reference to FIG. 4.

If it is decided in decision block 304 that the aggregated trend may be provided, process 300 proceeds to act 306, where the aggregated trend may be provided to the requester or requesters in any suitable way. For example, the aggregated trend may be displayed to a software maker, electronically communicated to the software maker, and/or saved such that it may be provided to the software maker at a later time. Though, it should be recognized that the aggregated trend may be provided to one or more software makers in any other suitable way as aspects of the present invention are not limited in this respect.

Alternatively, if it is decided in decision block 304 that the measure of disorder in the aggregated trend is not sufficiently high to provide the aggregated trend without risking also revealing information about an individual trend, process 300 proceeds to decision block 308. At block 308, further analysis may be done on the individual trends to determine whether the aggregated trend obtained may be used to at least partially identify one of the individual trends.

In some embodiments, the analysis performed on the individual trends, as part of act 306, may comprise measuring similarity between pairs of trends. Similarity may be measured between pairs of individual trends and/or between an aggregated trend and an individual trend. Measuring similarity between trends may be indicative of whether it is possible to at least partially identify one of the individual trends by using the aggregated trend. For example, suppose that a group of at least three individual trends (a subset of the individual trends from which the aggregated trend was obtained) are determined to be similar to one another and, in addition, the individual trends in this group are determined to be more similar to the aggregated trend than to any other individual trend. In this case, it may be determined that the aggregated trend may be provided to a software maker associated with any of the individual trends in this group—since the individual trends in the group are similar and there is at least three of them, it is unlikely that the software maker could reliably identify any one these trends by using the aggregated trend. This is discussed in greater detail below with reference to FIG. 4.

If it is decided in decision block 308 that the aggregated trend may not be provided, the aggregated trend is not provided and process 300 completes. On the other hand, if it is decided in decision block 308 that the aggregated trend may be provided, process 300 proceeds to act 306, where the aggregated trend may be provided to one or more software makers in any suitable way including any of the ways previously described. After the aggregated trend is provided, process 300 completes.

It should be recognized that process 300 is merely illustrative and that many variations of process 300 are possible. For example, although in the illustrated embodiment, process 300 is used to decide whether one aggregated trend may be provided, in other embodiments process 300 may be adapted to decide whether multiple aggregated trends may be provided. As another example, process 300 may be adapted to determine whether to provide an aggregated trend by using either a measure of disorder or a measure of similarity, rather than by using both a measure of disorder and a measure of similarity as shown in the illustrated embodiment.

Figure 4:
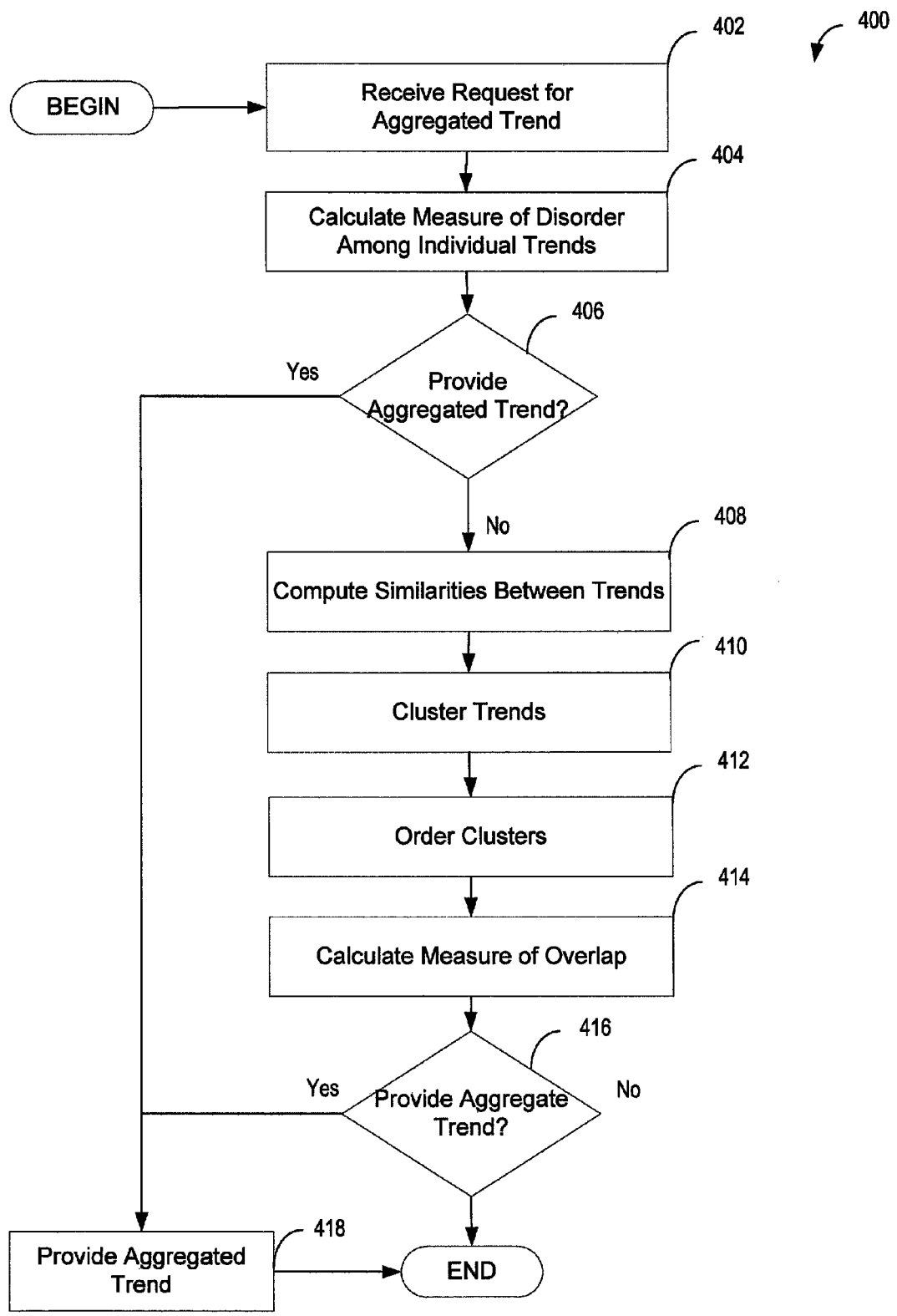
FIG. 4 is a flow chart of another illustrative process for selectively providing an aggregated trend, in accordance with some embodiments of the present disclosure.

FIG. 4 shows another illustrative process 400 for selectively providing one or more aggregated trends to one or more software makers. Similar to process 300, process 400 may be performed by an online system, such as online software distribution system 110 described with reference to FIG. 1. In addition, similar to process 300, process 400 makes a determination of whether to provide an aggregated trend by using a two-stage procedure as described in greater detail below.

Process 400 begins in act 402, where a request for an aggregated trend is received. The request may be any suitable request and may be any of the types of requests previously described with reference to act 302 of process 300. As such, the request may specify any suitable information that may be used to obtain the aggregated trend and, for example, may specify any information that may be used to identify a set of individual trends from which the aggregated trend may be obtained.

Next process 400 proceeds to act 404 where statistical analysis may be performed on the individual trends from which the aggregated trend was obtained to determine whether an aggregated trend obtained from the individual trends may be used to at least partially identify one of the individual trends. To this end, a measure of disorder among the individual trends may be computed because, as previously mentioned, it may be indicative of whether it is possible to at least partially identify one of the individual trends by using the aggregated trend.

Any suitable measure of disorder may be used. For example, in some embodiments, a measure of disorder may be calculated by computing entropy from the individual trends in transactions associated with one or more software applications. Any of numerous types of entropies may be computed such as Shannon entropy or Renyi entropy of any suitable order. In one embodiment, the measure of disorder may be computed by calculating a Renyi entropy since the set of individual trends may be biased due to the presence of a number of dominant individual trends.

For example, in the embodiment illustrated in FIG. 2, with individual trends being represented by rows of an M by N matrix F, the Renyi entropy may be calculated according to:

$$E(\alpha) = \frac{1}{1-\alpha} \log \sum_{i=0}^{M-1} \sum_{j=0}^{N-1} p_{ij}^{\alpha},$$

where $\alpha$ is the order of the Renyi entropy and may be any non-negative integer not equal to 1 (preferably $\alpha=2$) and the probabilities $p_{ij}$ are calculated from entries of the matrix F according to:

$$p_{ij} = \frac{f_{ij}}{\sum_{i=0}^{M-1} \sum_{j=0}^{N-1} f_{ij}}.$$

It should be recognized that although in the above-described example all individual trends specified in data structure 200 were used to compute a measure of disorder, this is not a limitation on aspects of the present invention as any subset of individual trends may be used to compute the measure of disorder. For example, the measure of disorder may be computed from the individual trends corresponding to a subset of software makers. As a specific example, the measure of disorder may be computed from the individual trends corresponding to a group of software makers that develop and/or distribute the top K downloaded/purchased software applications, where K is any suitable positive integer (e.g., K is at least 2, at least 5, at least 10, etc.). Though the above example is merely illustrative as the subset of individual trends used to compute a measure of similarity may be any identified in any other suitable way.

After the measure of disorder (e.g., $E(\alpha)$) is computed in act 404, process 400 proceeds to decision block 406, where a decision to provide the aggregated trend to one or more software makers may be made by using the computed measure of disorder. The decision may be made in any suitable way. For example, the computed measure of disorder may be compared with a predetermined threshold 13 and, if the computed measure of disorder it is greater than the predetermined threshold, it may be decided that the aggregated trend may be provided to the software maker(s). As another example, a measure of relative disorder ($\gamma$) may be calculated as a ratio of the computed measure of disorder to the maximum disorder associated with the chosen measure of disorder. For instance if the measure of disorder is a Renyi entropy, the measure of relative disorder may be $\gamma(\alpha)=E(\alpha)/\log(MN)$. In this case, it may be decided that the aggregated trend may be provided to the software maker(s) if the measure of relative disorder is greater than the predetermined threshold. The predetermined threshold may be any suitable threshold. For example, the predetermined threshold may be any suitable number between 0 and 1. In some embodiments, the threshold $\beta$ may be at least 0.5, at least 0.75, at least 0.80, at least 0.85, at least 0.90, etc.

If it is determined, in decision block 406, that the aggregated trend may be provided to one or more software makers, process 400 proceeds to act 418. The aggregated trend may be provided to one or more software makers in any suitable way and, for example, may be provided in any of the ways previously described with respect to act 306 of process 300. Otherwise, process 400 proceeds to perform acts 408-416, which comprise performing further analysis on the individual trends from which the aggregated trend was obtained such that the results of this analysis may be used to determine whether to provide the aggregated trend to one or more software makers.

First, process 400 proceeds to act 408, where similarities between trends may be computed. As previously mentioned, similarity may be measured between one or more pairs of individual trends and/or between an aggregated trend and one or more individual trends. Any of numerous ways of measuring similarity between trends may be employed. For example, similarity between trends may be measured by using any of numerous distance functions or metrics as known in the art including Euclidean distance, Minkowski distance, Mahalonobis distance, etc.

In some embodiments, the distance between two trends may be calculated by using a measure of similarity that depends on the shape of the curves associated with each of the two trends. The measure of similarity may also depend on the average magnitude (the central tendency) of each of the two trends. One such similarity measure may be computed with respect to two trends $F_i$ and $F_M$ (without loss of generality) according to:

$$d_{iM} = \frac{\left(1 - \frac{\mu_i}{\mu_M}\right)}{\sum_{k=0}^{N-1} \frac{f_{ik} \cdot f_{Mk}}{\sqrt{\sum_{r=0}^{N-1} f_{ir}^2} \cdot \sqrt{\sum_{l=0}^{N-1} f_{Ml}^2}}}$$

where $\mu_i$ and $\mu_M$ are defined according to $$\mu_i = \frac{1}{N} \sum_{j=0}^{N-1} f_{ij}$$

$$\mu_M = \sum_{i=0}^{M-1} \mu_i$$

In the above-described formula, the quantity $d_{iM}$ ($i\in[0,M-1]$) is the measure of similarity between the i'th individual trend $F_i$ and the aggregated trend $F_M$. Though, it should be appreciated that the above-described formula may be used to compute a measure of similarity between any two individual trends (e.g., the quantity $d_{ij}$ is the measure of similarity between the i'th and j'th individual trends $F_i$ and $F_j$, respectively).

It should be recognized that the denominator in the above formula is related to a measure of correlation between the two trends such that when the correlation between the two trends is high, the denominator is large, and the distance between the two trends is small. Accordingly, the more correlated two trends are, the more similar the trends are determined to be when the above-described similarity measure is used. It should also be recognized that the numerator is related to the (average) magnitude of each of the two trends such that the when their average magnitudes are close to one another (i.e., $\mu_i$ is close to $\mu_M$), the numerator is close to 0 and the distance between the two trends is small. Accordingly, the closer the magnitudes of the two trends are, the more similar the trends are determined to be when the above-described similarity measure is used.

The above-described similarity measure has a number of additional properties. As a preliminary matter, in the illustrated embodiment, it may be derived that $(\rho_{iM} \cdot \sigma_M) = \Sigma_{j=0}^{M-1} (\rho_{ij} \cdot \sigma_j)$, where $<\rho_{ij}>$ is the correlation coefficient between the i'th individual trend $F_i$ and the j'th individual trend $\sigma_i$ and $\sigma_M$ are the standard deviations of $F_i$ and $F_M$ respectively. This relationship may be used to establish a number of properties of the similarity measure, including:

1. $d_{i,i}=0$, $$d_{i,M} = \frac{\left(1 - \frac{\mu_i}{\mu_M}\right)\sqrt{(\sigma_i^2 + \mu_i^2) \cdot K}}{\sigma_i \cdot \sum_{s=0}^{M-1} \rho_{is} \cdot \sigma_s + \mu_i \cdot \sum_{s=0}^{M-1} \mu_s} = \frac{\left(1 - \frac{\mu_i}{\mu_M}\right)\sqrt{(\sigma_i^2 + \mu_i^2) \cdot K}}{(\sigma_i \cdot \rho_{iM} \cdot \sigma_M + \mu_i \cdot \mu_M)},$$

for all $0 \leq i < M$, where $$K = \sqrt{\sum_{r=0}^{M-1}(\sigma_r^2 + \mu_r^2) + 2\sum_{r=0}^{M-1}\sum_{s=r+1}^{M-1}(\sigma_r \cdot \rho_{rs} \cdot \sigma_s + \mu_r \cdot \mu_s)},$$

and

3. If each of the M individual trends is chosen at uniformly at random from a suitable interval at each time slot, then $\{\mu_i = \mu; \sigma_i = \sigma; \rho_{ij} = 0$ for $i \neq j$; for all $0 \leq i < M\}$. Hence, $\mu_M = M\mu$, and the similarity between $F_i$ and $F_M$ is a constant since:

$$d_{iM} = \frac{\left(1 - \frac{1}{M}\right)\sqrt{(\sigma^2 + \mu^2) \cdot K}}{(\sigma^2 + M \cdot \mu^2)} \text{ for all } 0 \leq i < M.$$

Any of the above-described similarity measures may be used to compute similarities between pairs of trends in act 408 of process 400. Regardless of how similarities among trends are computed in act 408, process 400 next proceeds to act 410, where the similarities among trends may be used to cluster the individual trends from which an aggregated trend was obtained.

The individual trends may be clustered using any suitable clustering technique. For example, the individual trends may be clustered by using any technique that may use a measure of similarity between the individual trends in order to cluster the individual trends. In particular, any technique that may use one or more similarities computed in act 408 to cluster the individual trends may be used. For example, in some embodiments, clustering may be done by using a hierarchical clustering algorithm, the K-means clustering, variance-optimized learning-based clustering, density-based clustering, etc. It should be recognized that any other suitable clustering algorithm may be used as the precise clustering algorithm used is not a limitation of aspects of the present invention.

Regardless of the way in which the individual trends were clustered in act 410, process 400 next proceeds to act 412, where the clusters may be ordered. The clusters of individual trends may be ordered in any suitable way and, for example, may be ordered based on their degree of similarity to the aggregated trend. The degree of similarity between a cluster of individual trends and the aggregated trend may be determined in any suitable way and, for example, may be determined by using the measure of similarity used to cluster the individual trends. For example, the similarity between a cluster of individual trends and the aggregated trend may be determined based on the similarities between the individual trends within the cluster and the aggregated trend (e.g., based on the average of such similarities, median of such similarities, etc.). Though, it should be recognized that the clusters may be ordered in any other suitable technique.

Regardless of the way in which clusters are ordered in act 412, process 400 proceeds to act 414, where a measure overlap between individual trends used to obtain an aggregated trend may be calculated. A measure of overlap between individual trends may be used to determine whether any of the individual trends may be at least partially identified by using the aggregated trend. For example, consider a situation where a cluster of individual trends consists of two "non-overlapping" trends such that the first individual trend indicates that the first software application was purchased many times in the period from January-July, but rarely purchased August-December, and the second individual trend indicates that the second software application was rarely purchased January-July, but purchased many times August-December. The individual trends do not substantially overlap in the sense that there is no time period in which both trends substantially contribute to the aggregated trend. As such, it may be easy to identify the individual trends by using the aggregated trend. Though, it should be recognized that there are many situations, involving two or more individual trends, where one of the individual trends does not substantially overlap with any of other individual trends and, as such, may be at least partially identified by using the aggregated trend.

Accordingly, in act 414, a measure of overlap may be computed for one or more pairs of individual trends that were used to obtain the aggregated trend. In some embodiments, a measure of overlap may be computed for pairs of individual trends consisting of individual trends in the same cluster (e.g., any one of the clusters identified in act 410). For example, a measure of overlap may be computed for pairs of individual trends in the first cluster, the second cluster, and/or the third cluster. In some instances, the measure of overlap may be computed for all pairs of individual trends in a cluster. However, in other instances, the measure of overlap may be computed only for some of the pairs of individual trends in a cluster. Preferably, the measure of overlap is computed for all pairs of individual trends in at least the first cluster of individual trends identified in act 410.

Any suitable measure of overlap between trends may be computed. For example, any measure of overlap between two trends that depends on the amount of correlation between the two trends may be used. As a specific example, in some embodiments, the measure of overlap between individual trend $F_i$ and $F_j$ may be computed according to:

$$OL_{i,j} = \sum_{k=0}^{N-1} \frac{f_{ik} \cdot f_{jk}}{\sqrt{\sum_{r=0}^{N-1} f_{ir}^2} \cdot \sqrt{\sum_{l=0}^{N-1} f_{jl}^2}}.$$

Next, process 400 proceeds to decision block 416, where a decision of whether to provide the aggregated trend to a software maker is made. The decision may be made in any suitable way and may be made based on any of numerous factors. For example, the decision may be made based on at least in part on a subset of the results of the analysis performed in acts 408-414. As one example, the decision of whether to provide the aggregated trend may be made based at least in part on a measure of similarity between trends that was computed in act 408. Additionally, the decision of whether to provide to provide the aggregated trend may be made based at least in part on the clusters of individual trends obtained in act 410. Additionally, the decision may be made based at least in part on the ordering of the clusters obtained in act 412. Additionally, the decision may be made based at least in part on a measure of overlap computed for one or more pairs of individual trends in act 414. As another example, the decision may be made based at least in part on which software maker is to be provided with the aggregated trend if it were decided to provide the aggregated trend.

For example, in some embodiments, it may be decided that the aggregated trend may be provided if the first cluster (i.e., the cluster most similar to the aggregated trend) comprises at least three individual trends. As another example, it may be decided that the aggregated trend may be provided if the first cluster consists of two individual trends neither of which is a trend in transactions associated with a software application developed and/or distributed by a software maker to whom the aggregated trend is to be provided. As yet another example, it may be decided that the aggregated trend may be provided if the first cluster consists of one trend, the second cluster consists of one trend, but neither of these two trends is a trend in transactions associated with a software maker to whom the aggregated trend is to be provided. As yet another example, it may be decided that the aggregated trend may not be provided if the first cluster contains an individual trend whose degree of overlap with each of the other individual trends in the cluster (as measured by the above-described measure of overlap) is below a predetermined threshold (e.g., below 0.25, below 0.1, below 0.01, below 0.001, etc.). It should be recognized that there are numerous other scenarios where a decision to provide the aggregated trend may be made. For example, it may be decided that the aggregated trend may be provided if the first cluster consists of one individual trend in transactions associated with a software maker to whom the aggregated trend is to be provided.

If it is decided in act 416 that the aggregated trend may not be provided, the aggregated trend is not provided and process 400 completes. On the other hand, if it is decided in act 416 that the aggregated trend may be provided, process 400 proceeds to act 418, where the aggregated trend may be provided to one or more software makers in any suitable way including any of the ways previously described. After the aggregated trend is provided, process 400 completes.

It should be recognized that process 400 is merely illustrative and that many variations of process 400 are possible. For example, although in the illustrated embodiment similarities between trends were calculated in act 408, in other embodiments similarities between trends may be calculated as part of the clustering performed in acts 410 and 412. As another example, process 400 may be adapted to determine whether to provide an aggregated trend by using either a measure of disorder or a measure of similarity, rather than by using both a measure of disorder and a measure of similarity as shown in the illustrated embodiment.

Figure 5:
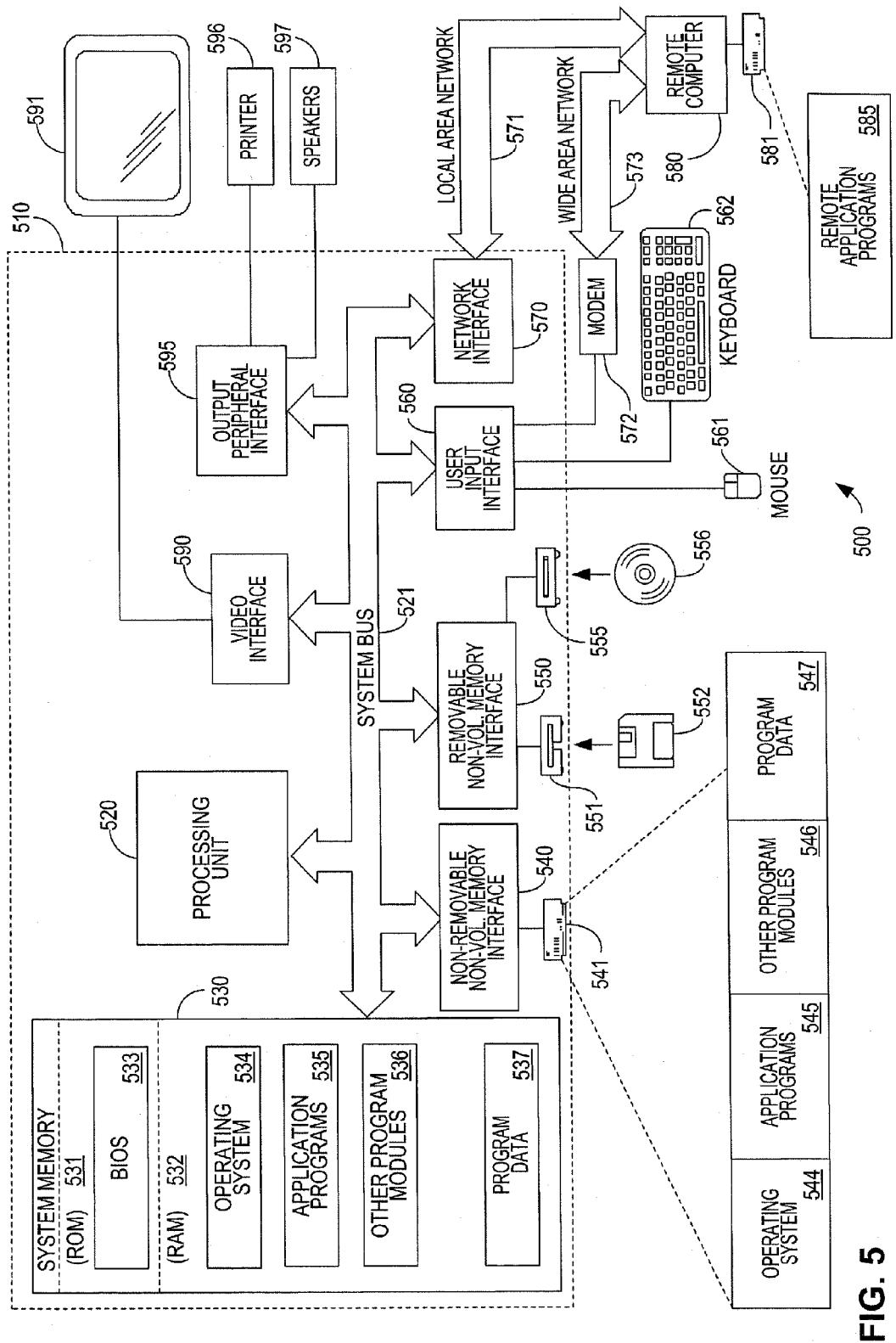
FIG. 5 is a block diagram generally illustrating an example of a computer system that may be used in implementing aspects of the present disclosure.

FIG. 5 illustrates an example of a suitable computing system environment 500 on which the invention may be implemented. Computing system environment 500, for example, may represent a server that processes trends to determine whether an aggregated trend may be released to a specific requester. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules, and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball, or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, it should be appreciated that techniques as described herein may be applied to any system that selectively provides aggregated trend information.

As an example of another variation, embodiments were described in which a determination of whether to release aggregated data was made first by determining whether a measure of disorder was above or below a threshold and then secondarily based on a measure of similarity among two or more trends. It should be appreciated that the measure of similarity need not be applied in all cases when disorder is below a threshold. For example, the measure of similarity may be applied only when the disorder is within a range. In such an embodiment, if the disorder is very low, aggregated trend data may not be released, regardless of the measure of similarity.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein (e.g., methods 300 and 400) may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed on a computing device, the method for selectively providing an aggregated trend obtained from at least a subset of a plurality of individual trends, the method comprising deciding whether to provide the aggregated trend by determining whether an individual trend in at least the subset of the plurality of individual trends can be at least partially identified from the aggregated trend, the determining comprising:

clustering at least the subset of the plurality of individual trends to obtain a plurality of clusters;

identifying a first cluster in the plurality of clusters as a most similar cluster to the aggregated trend based on a similarity measure that indicates a similarity between two trends; and where the deciding comprises deciding to provide the aggregated trend if there are at least three individual trends in the first cluster.

2. The method of claim 1, where the determining comprises calculating a measure of disorder among trends in at least the subset of the plurality of individual trends, and where the deciding comprises deciding to provide the aggregated trend when the computed measure of disorder is greater than a predetermined threshold.

3. The method of claim 2, where the deciding further comprises deciding to provide the aggregated trend based at least in part on a measure of similarity between trends, when the computed measure of disorder is below the predetermined threshold.

4. The method of claim 3, wherein the first quantity is a Renyi entropy.

5. The method of claim 1, where each trend in at least the subset of the plurality of individual trends is associated with a corresponding software maker, and where the deciding further comprises deciding whether to provide the aggregated trend to a first software maker if the first cluster consists of two individual trends neither of which is associated with the first software maker.

6. The method of claim 1, where the similarity measure depends on correlation between the two trends.

7. The method of claim 1, where the determining further comprises calculating a measure of overlap indicative of whether two or more trends in the first cluster substantially overlap, and where the deciding further comprises deciding not to provide the aggregated trend if the computed measure of overlap is below a predetermined threshold.

8. The method of claim 1, where an individual trend in the plurality of individual trends comprises a number of downloads or purchases of a software application for at least two time periods.

9. A computing device comprising: at least one processor and at least one program module together configured for performing actions for selectively providing an aggregated trend obtained at least in part by aggregating at least a subset of a plurality of individual trends, the actions comprising:

computing a measure of disorder in at least the subset of the plurality of individual trends; and deciding whether to provide the aggregated trend based on the computed measure of disorder, the deciding comprising:

clustering at least the subset of the plurality of individual trends resulting in a plurality of clusters;

identifying a first cluster in the plurality of clusters as a most similar cluster to the aggregated trend based on a similarity measure that indicates a similarity between two trends; and deciding to provide the aggregated trend if there are more than two individual trends in the first cluster.

10. The computing device and at least one program module of claim 9, the actions further comprising providing the aggregated trend in response to the computed measure of disorder being greater than a predetermined threshold.

11. The computing device and at least one program module of claim 9 where the similarity measure depends on correlation between the two trends.

12. The computing device and at least one program module of claim 9 where each trend in at least the subset of the plurality of individual trends is associated with a corresponding software maker, and where the deciding further comprises deciding whether to provide the aggregated trend to a first software maker if the first cluster consists of two individual trends neither of which is associated with the first software maker.

13. The computing device and at least one program module of claim 12, the actions further comprising allowing one or more users to download or purchase a software application, where an individual trend in the plurality of individual trends comprises a number of downloads or purchases of the software application for each of at least two time periods.

14. The computing device and at least one program module of claim 12 where the aggregated trend comprises a number of downloads of a plurality of software applications in a same category as a software application made at least by the first software maker for each of at least two time periods.

15. At least one tangible computer-readable storage device storing computer executable instructions that, when executed by a computing device cause the computing device to perform actions for selectively providing an aggregated trend to a first software maker, where the provided aggregated trend relates to at least a subset of a plurality of individual trends associated with a plurality software makers comprising the first software maker and a second software maker, the actions comprising:

computing a measure of disorder in at least the subset of the plurality of individual trends;

providing the aggregated trend to the first software maker in response to the computed measure of disorder being greater than a predetermined threshold; and deciding whether to provide the aggregated trend based at least in part on a measure of similarity between two trends and in response to the computed measure of disorder being below the predetermined threshold, where the deciding comprises:

clustering at least the subset of the plurality of individual trends resulting in a plurality of clusters;

identifying a first cluster in the plurality of clusters as a most similar cluster to the aggregated trend; and deciding to provide the aggregated trend to the first software maker if there are more than two individual trends in the first cluster.

16. The at least one computer-readable storage medium of claim 15 where each trend in at least the subset of the plurality of individual trends is associated with a corresponding software maker, and where the deciding further comprises deciding whether to provide the aggregated trend to the first software maker if the first cluster consists of two individual trends neither of which is associated with a software application developed and/or distributed by the first software maker.

17. The at least one computer-readable storage medium of claim 15 where computing the measure of disorder in at least the subset of the plurality of individual trends comprises computing a Renyi entropy.

* * * * *